(12) United States Patent
O'Brien et al.

(10) Patent No.: US 10,223,260 B2
(45) Date of Patent: Mar. 5, 2019

(54) COMPILER-GENERATED MEMORY MAPPING HINTS

(71) Applicant: International Business Machines Corporation, Armonk, NY (US)

(72) Inventors: Kathryn M. O'Brien, South Salem, NY (US); John K. O'Brien, South Salem, NY (US); Zehra N. Sura, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 14/219,136

(22) Filed: Mar. 19, 2014

(65) Prior Publication Data

US 2015/0269073 A1 Sep. 24, 2015

(51) Int. Cl.
*G06F 12/06* (2006.01)
*G06F 12/10* (2016.01)

(52) U.S. Cl.
CPC .............. *G06F 12/06* (2013.01); *G06F 12/10* (2013.01); *G06F 2212/251* (2013.01); *G06F 2212/657* (2013.01); *Y02D 10/13* (2018.01)

(58) Field of Classification Search
CPC .... G06F 11/3636; G06F 11/362; G06F 12/02; G06F 12/06; G06F 12/0646; G06F 9/30145; G06F 2212/251; G06F 2212/657; G06F 2212/452; G06F 2212/453; G06F 2212/50; G06F 2212/502; G06F 2212/507;
(Continued)

(56) References Cited

U.S. PATENT DOCUMENTS

| 5,613,136 A | 3/1997 | Casavant et al. |
| 6,289,424 B1 * | 9/2001 | Stevens .................. G06F 9/5016 711/147 |
| 7,934,061 B2 | 4/2011 | da Silva et al. |

(Continued)

OTHER PUBLICATIONS

López-Lagunas, A. and S.M. Chai, "Compiler manipulation of stream descriptors for data access optimization," International Conference on Parallel Processing Workshops, 2006.*
(Continued)

*Primary Examiner* — Tracy A Warren
(74) *Attorney, Agent, or Firm* — Cantor Colburn LLP

(57) ABSTRACT

According to one embodiment, a method of creating compiler-generated memory mapping hints in a computer system includes analyzing code, by a compiler of the computer system, to identify data access patterns in the code. System configuration information defining data processing system characteristics of a target system for the code is accessed. The data processing system characteristics include a plurality of processing resources and memory domain characteristics relative to the processing resources. A preferred allocation of data in memory domains of the target system is determined based on mapping the code to one or more selected processing resources and mapping the data to one or more of the memory domains based on the memory domain characteristics relative to the one or more selected processing resources. The preferred allocation is stored as compiler-generated memory mapping hints in a format accessible by a physical memory mapping resource of the target system.

20 Claims, 5 Drawing Sheets

(58) Field of Classification Search
CPC ..... G06F 2212/6026; G06F 2212/6028; G06F 2212/6042
USPC ........ 711/170–171, 173, 117, 141, 147–148; 717/149, 151, 153; 710/22
See application file for complete search history.

(56) References Cited

U.S. PATENT DOCUMENTS

| | | |
|---|---|---|
| 8,453,132 B2 | 5/2013 | Mannarswamy et al. |
| 2008/0126736 A1* | 5/2008 | Heil ................... G06F 12/0253 711/171 |

OTHER PUBLICATIONS

Sek Chai, et al. "Streaming Processors for Next Generation Mobile Imaging Applications," IEEE Communications Magazine, vol. 43, No. 12, pp. 81-89, Dec. 2005.*

Bugnion, Edouard et al., "Compiler-directed Page Coloring for Multiprocessors," ACM SIGPLAN Notices 31, No. 9, Oct. 1996, pp. 244-255.

Chandra, Rohit et al., "Data Locality and Load Balancing in COOL," ACM SIGPLAN Notices, vol. 28, No. 7, pp. 249-259, ACM, May 1993.

Sherwood, Timothy et al., "Reducing Cache Misses using Hardware and Software Page Placement," Proceedings of the 13th International Conference on Supercomputing, pp. 155-164, ACM, Jun. 1999.

* cited by examiner

COMPILER-GENERATED MEMORY MAPPING HINTS

GOVERNMENT RIGHTS

This invention was made with Government support under Contract No.: B599858 awarded by the Department of Energy. The Government has certain rights in this invention.

BACKGROUND

The present invention relates to computer system management, and more specifically, to compiler-generated hints for mapping data to non-uniform memory domains of physical memory.

Computer systems often require a considerable amount of high speed memory, such as random access memory (RAM), to hold information, such as data and programs, when a computer is powered and operational. Computer memory and processing resources have continued to grow as computer systems have increased in performance and complexity. Computer systems that include multiple processing resources and regions of memory can further complicate efficient allocation and use of available resources.

In operation, a compiler in memory receives a program and compiles it to produce an application program as an executable module. The application program may include code that is placed into physical memory prior to or at runtime. The application program can create, access, and modify data structures in physical memory. The physical memory can include multiple non-uniform domains with different latency or bandwidth characteristics. The compiler typically operates on virtual addresses without detailed knowledge of the physical memory. The compiler relies upon an operating system and underlying hardware to map virtual memory to physical memory; however, in deciding physical data mapping, the operating system and hardware are not typically aware of the specific needs of the application program. As a result, the selected physical data mapping may not be optimal, which can result in greater execution latency and reduced overall computer system performance.

SUMMARY

According to one embodiment, a method of creating compiler-generated memory mapping hints in a computer system includes analyzing code, by a compiler of the computer system, to identify data access patterns in the code. System configuration information defining data processing system characteristics of a target system for the code is accessed. The data processing system characteristics include a plurality of processing resources and memory domain characteristics relative to the processing resources. A preferred allocation of data in memory domains of the target system is determined based on mapping the code to one or more selected processing resources and mapping the data to one or more of the memory domains based on the memory domain characteristics relative to the one or more selected processing resources. The preferred allocation is stored as compiler-generated memory mapping hints in a format accessible by a physical memory mapping resource of the target system.

According to another embodiment, a system for creating compiler-generated memory mapping hints includes a processor and a memory system with a compiler. The compiler includes instructions executable by the processor to analyze code and identify data access patterns in the code. System configuration information defining data processing system characteristics of a target system for the code is accessed. The data processing system characteristics include a plurality of processing resources and memory domain characteristics relative to the processing resources. A preferred allocation of data in memory domains of the target system is determined based on mapping the code to one or more selected processing resources and mapping the data to one or more of the memory domains based on the memory domain characteristics relative to the one or more selected processing resources. The preferred allocation is stored as compiler-generated memory mapping hints in a format accessible by a physical memory mapping resource of the target system.

According to a further embodiment, a computer program product for creating compiler-generated memory mapping hints in a computer system is provided. The computer program product includes a computer readable storage medium having program instructions embodied therewith. The program instructions are executable by a processor of the computer system to cause the processor to perform a method that includes analyzing code, by a compiler, to identify data access patterns in the code. System configuration information defining data processing system characteristics of a target system for the code is accessed. The data processing system characteristics include a plurality of processing resources and memory domain characteristics relative to the processing resources. A preferred allocation of data in memory domains of the target system is determined based on mapping the code to one or more selected processing resources and mapping the data to one or more of the memory domains based on the memory domain characteristics relative to the one or more selected processing resources. The preferred allocation is stored as compiler-generated memory mapping hints in a format accessible by a physical memory mapping resource of the target system.

DETAILED DESCRIPTION

Exemplary embodiments are directed to creating compiler-generated memory mapping hints in a computer system. In a target system for which a compiler generates executable code, data accessed by the executable code can be distributed in multiple memory domains. The target system can also include multiple processing resources that may access the memory domains. The layout and interconnections between the processing resources and memory domains can result in different latency and memory bandwidth relationships between processing resource and memory domain pairings. For example, a processing resource and memory domain pair that is in close proximity may experience a lower latency and higher bandwidth than a processing resource and memory domain pair that is separated by a greater distance. In a modular configuration, processing resources and memory domains that are part of the same module can operate with a higher throughput than when processing resources and memory domains are in different modules. In an exemplary embodiment, the compiler analyzes data access patterns in code and determines a preferred allocation of data in memory domains of the target system based on mapping the code to one or more selected processing resources, and mapping the data to one or more of the memory domains based on the memory domain characteristics relative to the one or more selected processing resources. The preferred allocation can be used by a physical memory mapping resource of the target system, such as an operating system, to make informed address mapping decisions for virtual to physical address mapping.

The target system hardware may use its own algorithm to determine a final mapping of data into physical memory. As such, two data items that have consecutive addresses in virtual memory may be located far apart in physical memory of the target system. When a parallel application executes on the target system without a preferred allocation identified, the target system hardware does not know what data will be accessed by a given processing resource. The preferred allocation determination allows encoding of data-mapping hints and use of these hints to improve the mapping of data to physical memory. When the compiler generates code for a parallel application, it can determine which code sections are to execute on the same processing resource, and what data items are accessed within specific code sections. The compiler may insert hints in the executable code that relate data items to memory domains for optimized placement.

Figure 1:
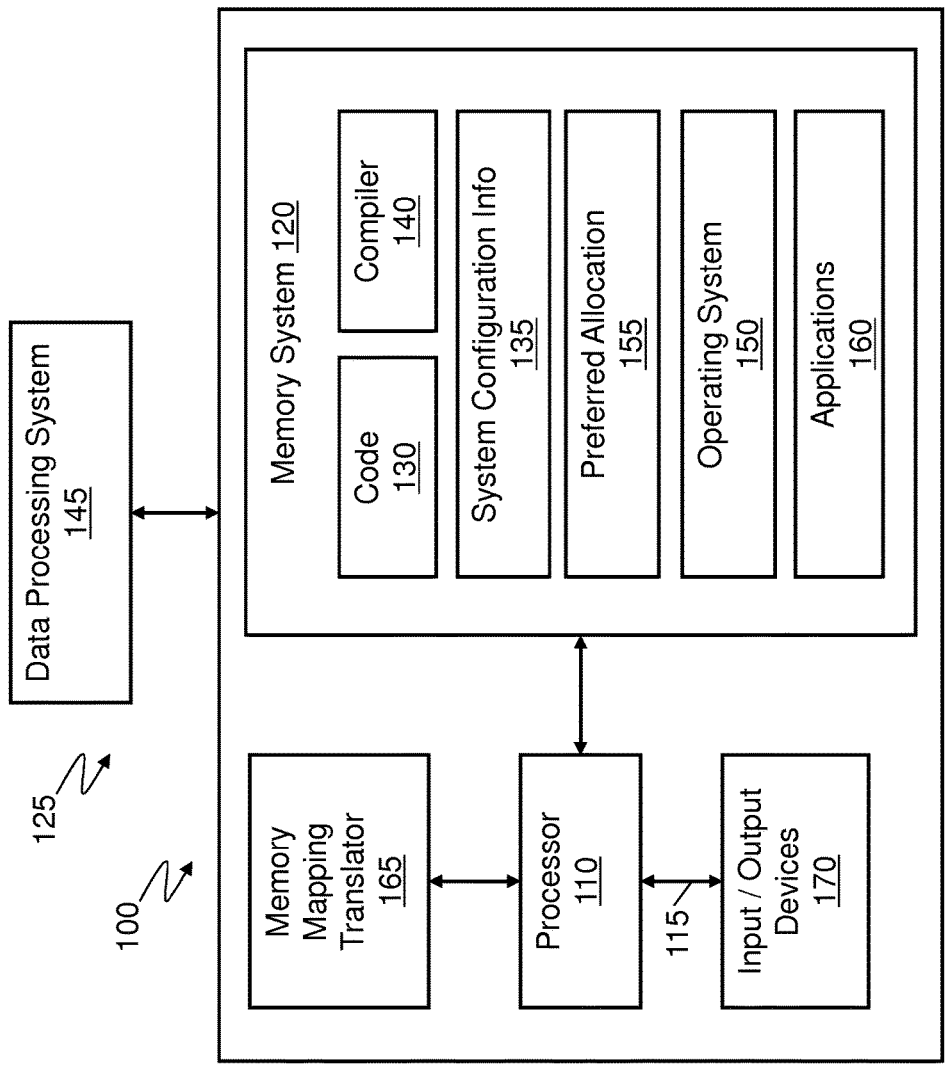
FIG. 1 illustrates a block diagram of a computer system in accordance with an embodiment.

FIG. 1 illustrates an example of a computer system 100 having capabilities, which may be included in exemplary embodiments. Various methods, procedures, modules, flow diagrams, tools, application, circuits, elements, and techniques discussed herein may also incorporate and/or utilize the capabilities of the computer system 100. Moreover, capabilities of the computer system 100 may be utilized to implement features of exemplary embodiments discussed herein. One or more of the capabilities of the computer system 100 may be utilized to implement, to connect to, and/or to support any element discussed herein.

Generally, in terms of hardware architecture, the computer system 100 may include one or more processor 110, a memory system 120, and one or more input and/or output (I/O) devices 170 that are communicatively coupled via a local interface 115. The local interface 115 can be, for example but not limited to, one or more buses or other wired or wireless connections, as is known in the art. The local interface 115 may have additional elements, such as controllers, buffers (caches), drivers, repeaters, and receivers, to enable communications. Further, the local interface 115 may include address, control, and/or data connections to enable appropriate communications among the aforementioned components.

The processor 110 is a hardware device for executing software that can be stored in the memory system 120. The processor 110 can be virtually any custom made or commercially available processor, a central processing unit (CPU), a digital signal processor (DSP), a microcontroller, or an auxiliary processor among several processors associated with the computer system 100, and the processor 110 may be a semiconductor based microprocessor (in the form of a microchip) or a macroprocessor.

The memory system 120 is a computer readable storage medium and can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory system 120 may incorporate electronic, magnetic, optical, and/or other types of storage media. The memory system 120 can have a distributed architecture, where various components are situated remote from one another, but can be accessed by the processor 110. For instance, the memory system 120 can include memory domains in a data processing system 145. Alternatively, memory domains in the data processing system 145 can be managed independent of the memory system 120.

Software in the memory system 120 may include one or more separate programs, each of which comprises an ordered listing of executable instructions for implementing logical functions. The software in the memory system 120 includes code 130, a compiler 140, an operating system 150, and one or more applications 160. As illustrated, the compiler 140, operating system 150, and applications 160 comprise numerous functional components for implementing the features, processes, methods, functions, and operations for the computer system 100.

The code 130 may be a source program, object code, script, or any other entity comprising a set of instructions to be performed. The compiler 140 analyzes the code 130 and generates an executable version of the code 130 for a target system 125. The target system 125 may be the computer system 100, a subsystem of the computer system 100, or a separate system. In the example of FIG. 1, the target system 125 includes the data processing system 145, which may be a subsystem of the computer system 100 that is configured to perform parallel data processing tasks. In an exemplary embodiment, the compiler 140 accesses system configuration information 135 to discover data processing system characteristics of the target system 125, such as processing resources and memory domain characteristics relative to the processing resources. The compiler 140 can identify all of the data accesses in the code 130 as well as determine a parallelization scheme for the processing resources to execute portions of the code 130.

The compiler 140 can access data in terms of virtual addresses and relies upon the operating system 150 or another physical memory mapping resource to map virtual addresses into physical addresses in the target system 125. The compiler 140 can analyze data access patterns in sections of the code 130 and determine a preferred allocation 155 of data in memory domains of the target system 125. The preferred allocation 155 can be stored as a preference record for use by the operating system 150 to identify desired mapping of virtual addresses to memory domains. The preferred allocation 155 need not be precise or cover all data. Rather, the preferred allocation 155 is provided to the operating system 150 for instances where the compiler is able to identify a pattern or set of data access conditions that would likely benefit from a particular allocation. The compiler 140 can insert operating system calls at appropriate points in the code 130 to specify mapping preferences or may otherwise convey the preferred allocation 155 using files or records readable by the operating system 150.

The operating system 150 may control the execution of the applications 160, and provides scheduling, input-output control, file and data management, memory management, and communication control and related services. The operating system 150 is an example of a physical memory mapping resource. The operating system 150 may utilize a dedicated hardware resource or function, such as a memory mapping translator 165, to convert virtual addresses into physical addresses in the target system 125. The memory mapping translator 165 can be incorporated anywhere within the computer system 100 including the data processing system 145, and the computer system 100 may include multiple instances of the memory mapping translator 165. The operating system 150 can examine the preferred allocation 155 relative to allocations made for the applications 160, the system configuration information 135, and other system constraints to determine whether the preferred allocation 155 can be met in the target system 125. Where the preferred allocation 155 cannot be met, the operating system 150 may use the preferred allocation 155 as a starting point for determining a next best allocation. For example, if the preferred allocation 155 targets a particular memory domain that is in close proximity to a particular processing resource but the memory domain is not available, the operating system 150 can allocate a neighboring memory domain that has similar latency and bandwidth characteristics relative to the particular processing resource. Furthermore, if the preferred allocation 155 includes a strided data mapping pattern requested for a particular group of memory domains and the pattern cannot be realized, the operating system 150 can select an alternate group of memory domains in which the strided data mapping pattern can be realized. In this way, even where the preferred allocation 155 is not directly realizable in the target system 125, the preferred allocation 155 provides hints that can still improve allocation over a blind or pseudo-random allocation process.

Further regarding the computer system 100, the I/O devices 170 may include input devices (or peripherals) such as, for example but not limited to, a mouse, keyboard, scanner, microphone, camera, etc. Furthermore, the I/O devices 170 may also include output devices (or peripherals), for example but not limited to, a printer, display, etc. Finally, the I/O devices 170 may further include devices that communicate both inputs and outputs, for instance but not limited to, a network interface card (NIC) or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or an intranet. The I/O devices 170 may be connected to and/or communicate with the processor 110 utilizing wireless connections and cables (via, e.g., Universal Serial Bus (USB) ports, serial ports, parallel ports, FireWire, High-Definition Multimedia Interface (HDMI), etc.).

When the computer system 100 is in operation, the processor 110 is configured to execute software stored within the memory system 120, to communicate data to and from the memory system 120, and to generally control operations of the computer system 100 pursuant to the software. The applications 160 and the operating system 150 are read, in whole or in part, by the processor 110, perhaps buffered within the processor 110, and then executed. The compiler 140 can be selectively initiated when compilation of the code 130 is desired.

It is understood that the computer system 100 includes non-limiting examples of software and hardware components that may be included in various devices, servers, and systems discussed herein, and that additional software and hardware components may be included in the various devices and systems discussed in exemplary embodiments. The computer system 100 is one example of a configuration that may be utilized to perform the processing described herein. Although the computer system 100 has been depicted with only a processor 110, a memory system 120, and a data processing system 145, it will be understood that other embodiments can also operate in other systems with two or more of the processor 110, memory system 120, and data processing system 145. In an embodiment, the processor 110, memory system 120, and/or data processing system 145 are not located within the same computer. For example, the processor 110 and memory system 120 may be located in one physical location while the data processing system 145 is located in another physical location (e.g., across a network).

Figure 2:
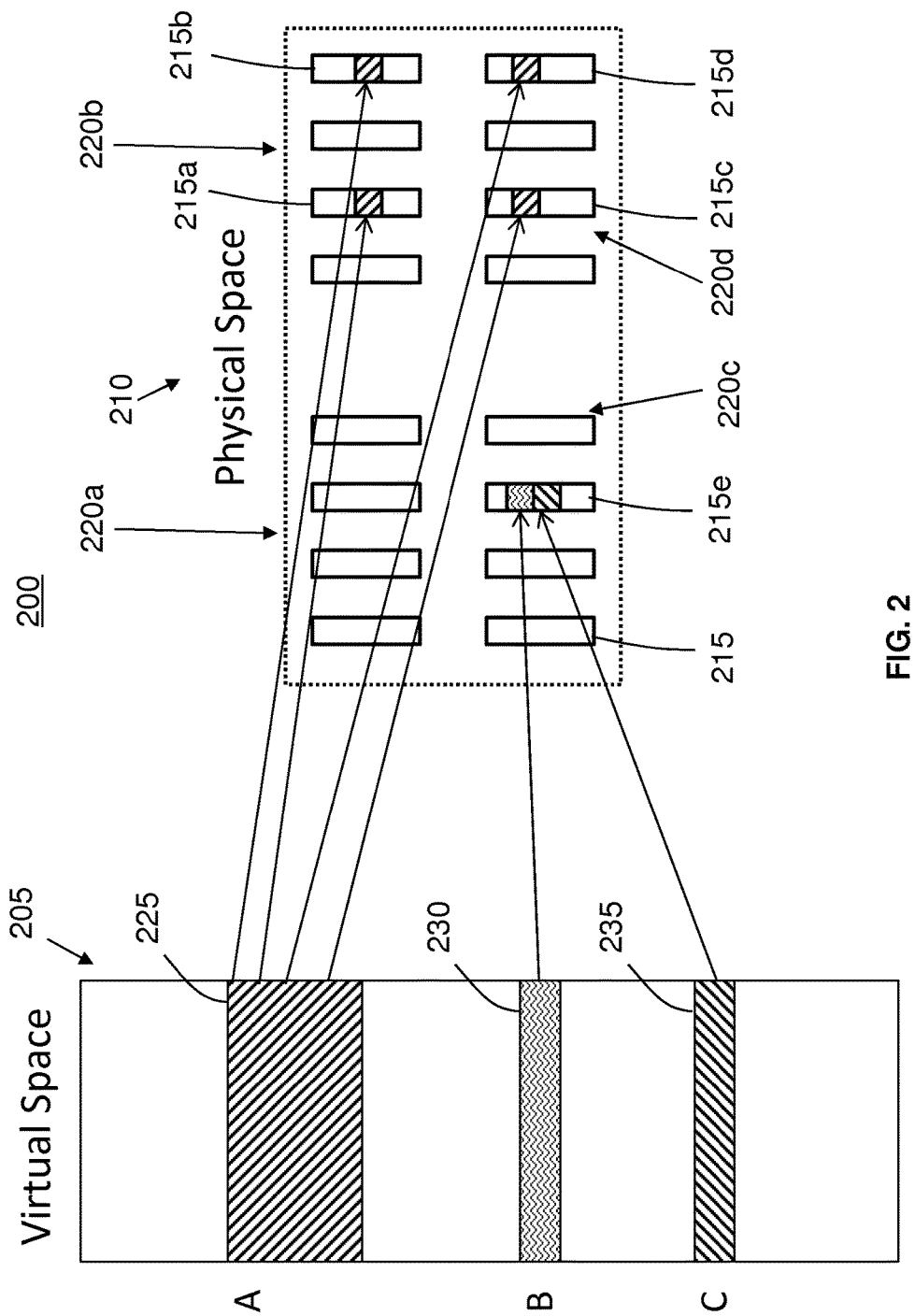
FIG. 2 illustrates a block diagram of an example of memory mapping between virtual and physical memory spaces in accordance with an embodiment.

FIG. 2 illustrates a block diagram 200 of an example of memory mapping between virtual and physical memory spaces in accordance with an embodiment. The compiler 140 of FIG. 1 and data structures created and/or accessed by the code 130 of FIG. 1 can operate in a virtual address space 205, while the target system 125 of FIG. 1 includes a physical address space 210. Various data items in the virtual address space 205 may appear to be located at contiguous addresses but can be distributed between multiple memory domains 215 of the physical address space 210. In the example of FIG. 2, the physical address space 210 includes four groups of the memory domains 215. A first group 220*a*, a second group 220*b*, a third group 220*c*, and a fourth group 220*d* each include four memory domains 215.

In determining the preferred allocation 155 of FIG. 1, the compiler 140 of FIG. 1 can examine the code 130 of FIG. 1 and determine that there are three separate data items in the virtual address space 205, including data item A 225, data item B 230, and data item C 235. The compiler 140 of FIG. 1 can access the system configuration information 135 to determine the size of the memory domains 215 and the characteristics of the groups 220*a*-220*d*. Using this information, the compiler 140 of FIG. 1 may recognize that data item A 225 is too large to fit in a single memory domain 215. The compiler 140 of FIG. 1 can check the code 130 of FIG. 1 for access patterns to determine whether it is better to keep the data item A 225 within a same group or distribute the data item A 225 between multiple groups. For instance, if operations performed on the data item A 225 are isolated or performed sequentially, different distributions may be preferred. As one example, if data item A 225 represents a multi-dimensional array with input/output pairs, it may be preferred to distribute data item A 225 into separate groups 220. Pairings between the groups 220*a*-220*d* can also be influenced by latency and bandwidth relationships between groups. In the example of FIG. 2, data item A 225 is distributed to memory domains 215*a* and 215*b* of the second group 220*b* and to memory domains 215*c* and 215*d* of the fourth group 220*d*, where the second group 220*b* has a higher bandwidth and/or lower latency with respect to the fourth group 220*d* as compared to groups 220*a* and 220*c*.

Continuing with the example of FIG. 2, the compiler 140 of FIG. 1 may also determine that data item B 230 and data item C 235 are small enough to fit in a single memory domain 215 and that they are accessed sequentially in the code 130 of FIG. 1. As one example, the compiler 140 of FIG. 1 can define the preferred allocation 155 of FIG. 1 as locating the data item B 230 and data item C 235 in memory domain 215*e* of the third group 220*c*, which keeps data items B 230 and C 235 in close proximity to each other and in a separate group 220 from unrelated data item A 225. While the example of FIG. 2 is one possible example allocation, it will be understood that many different allocations are possible to support a large number of data items, memory domains 215 and groups 220 in various configurations.

Figure 3:
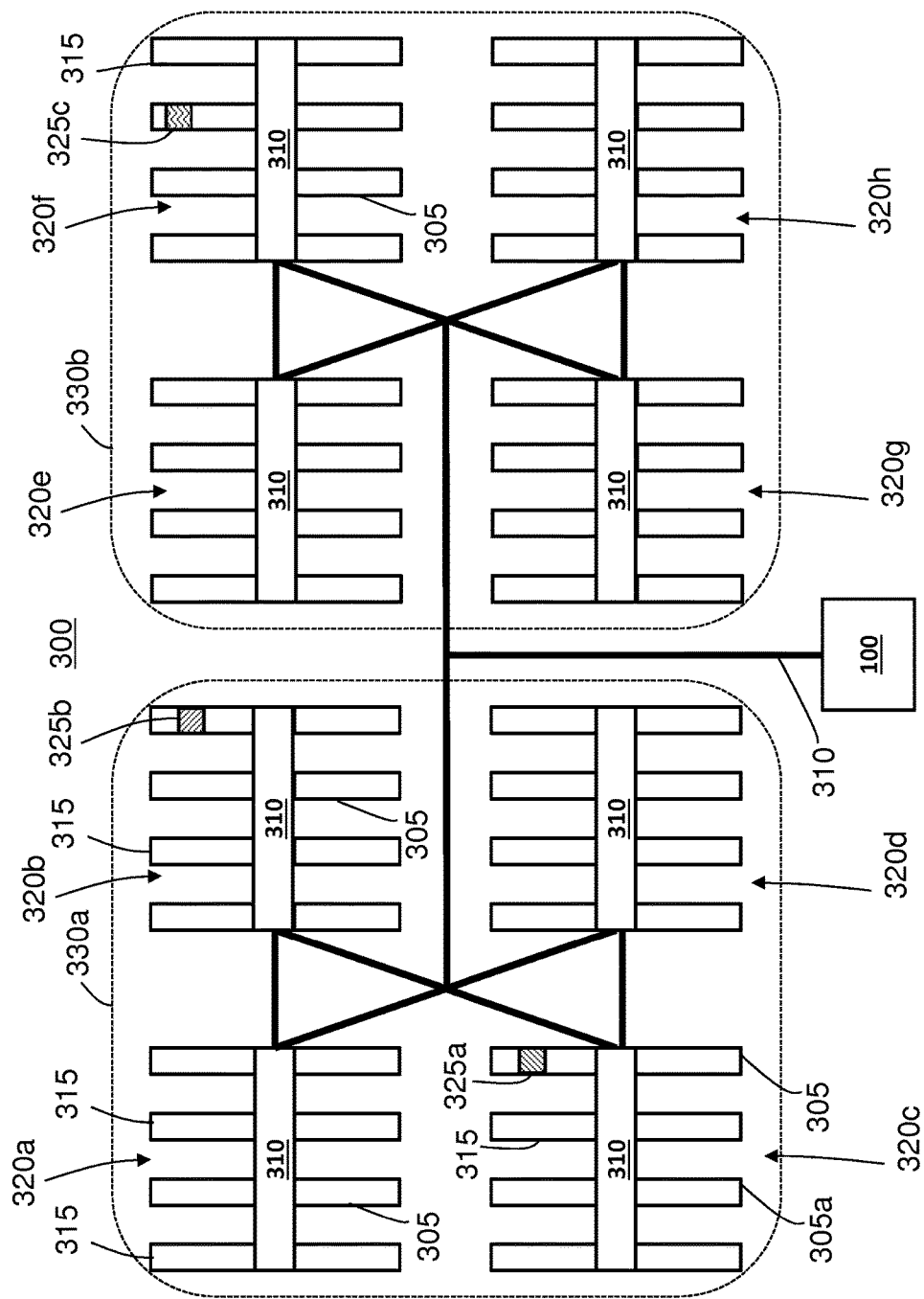
FIG. 3 illustrates a block diagram of a target system including multiple processing resources and memory domains in accordance with an embodiment.

FIG. 3 illustrates a block diagram of a target system 300 including multiple processing resources 305, interconnects 310, and memory domains 315 in accordance with an embodiment. The processing resources 305 can be any type of processor, processing core, processing element, or processing circuit known in the art that is capable of executing instructions. In an exemplary embodiment, the computer system 100 of FIG. 1 is coupled to an interconnect 310 to distribute executable portions of the code 130 of FIG. 1 to the processing resources 305. The processing resources 305 and memory domains 315 are grouped, where the interconnect 310 within each group 320 provides a higher bandwidth and lower latency connection between members of each group 320 than between multiple groups 320. Each memory domain 315 represents a block or portion of physical memory.

In the example of FIG. 3, there are four groups 320 per module 330 with each group 320 including four processing resources 305 and four memory domains 315 per group 320. Modules 330a and 330b together represent an example of the data processing system 145 of FIG. 1. Each of the groups 320 may represent a separate computer system or portion of a computer system. The data processing system 145 can be a large scale storage system, one or more servers, or another type of computing environment. In FIG. 3, module 330a includes groups 320a, 320b, 320c, and 320d, and module 330b includes groups 320e, 320f, 320g, and 320h. It will be understood that other arrangements are contemplated. The characteristics of the target system 300 can be stored as the system configuration information 135 of FIG. 1 for use by the compiler 140 of FIG. 1 in generating the preferred allocation 155 of FIG. 1 and for the operating system 150 of FIG. 1.

With continued reference to FIGS. 1 and 3, consider an example where the compiler 140 determines that execution of a portion of the code 130 should be performed in a processing resource 305a in group 320c. Relative to the processing resource 305a, placement of data 325a in a memory domain 315 of group 320c results in a lower latency than placement of data 325b in a memory domain 315 of group 320b. A longer latency may be experienced in accessing data 325c in group 320f of module 330b by the processing resource 305a in module 330a, assuming that accesses between module 330a and module 330b have a slower response time than accesses within the same module 330. As can be seen in the example of FIG. 3, characteristics of each memory domain 315 can be defined relative to each of the processing resources 305, as characteristics of the interconnect 310 and distances between pairings of the processing resources 305 and the memory domains 315 can impact performance. Additionally, the compiler 140 need not request placement of data at a precise physical address. Rather, the compiler 140 can indicate a preferred memory domain 315 for a data item in the preferred allocation 155 and allow the operating system 150 and memory mapping translator 165 to determine the precise physical address in the preferred memory domain 315.

Figure 4:
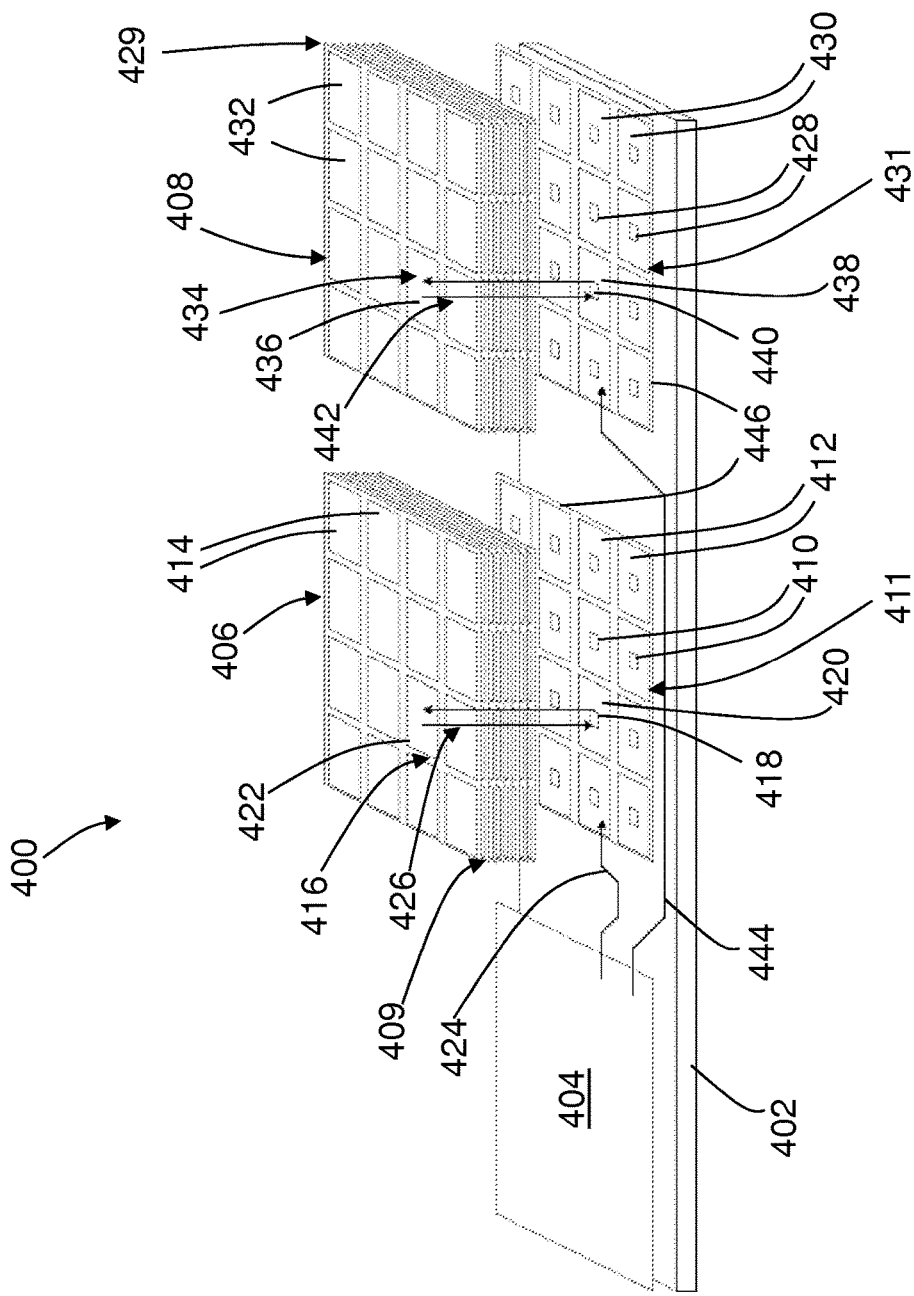
FIG. 4 illustrates a block diagram of another example of a computer system in accordance with an embodiment.

FIG. 4 is a diagram of an exemplary computer system 400 as a target system including active memory. In an embodiment, an active memory device can include a processing resource in a memory device, as discussed below. In embodiments, the processing resource is capable of performing a variety of tasks, such as arithmetic operations, loads, stores and decrements. In one embodiment, the processing resource receives a command from a main processor, where the command includes a series of instructions to be performed by the processing resource. In one embodiment, the processing resource is part of a memory system including an active memory device, such as an active buffered memory device. The memory device may be any suitable memory device including one or more memory device (e.g., random access memory "RAM" chips) connected to a memory controller chip configured to control the memory device. In an embodiment, the active memory device includes layers of memory that form a three dimensional ("3D") memory device where individual columns of memory chips form stacks or vaults in communication with the controller chip. In one embodiment, a plurality of memory stacks can be located on an active memory device, where each stack has a respective memory controller. The stacks may also include a processing resource configured to communicate with the memory and other processing resources in the active memory device. In other embodiments, processing resources are physically separated from the memory stacks but are still part of the active memory device, where the processing resources are pooled and available to perform instructions using any of the memory stacks within the device. The processing resource can receive commands or instructions from a main processor and perform operations based on the received commands. In an embodiment, a processing resource accesses a selected address in a vault through an interconnect network. In one embodiment, a plurality of memory devices, stacks and processing resources may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller or memory controller.

Embodiments include a memory stack with a processing resource and memory controller, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing resources for processing by the processing resource in the memory device. In one embodiment, the processing resources are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing resources, and a processor communications unit, for communication with the main processor.

In one embodiment, the active memory device is configured to load configuration information or instructions from a part of the active memory device into a processing resource following receiving a command from an external requestor in the computing system, such as a main processor or another processing resource. In addition, the processing resource may perform virtual-to-physical address translations that it computes while executing the loaded instructions.

In embodiments, it is desirable to have processing capabilities within the active memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing resources within the active memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

The computer system 400 includes a circuit board 402, a main processor 404, active memory device 406 and active memory device 408. The main processor 404 can be an embodiment of the processor 110 of FIG. 1 and the active memory devices 406 and 408 can be embodiments of the modules 330a and 330b of FIG. 3. The active memory device 406, active memory device 408 and main processor 404 are disposed on the circuit board 402. As depicted, portions of the active memory devices 406 and 408 are exploded to show details of the computer system 400 arrangement. The active memory devices 406 and 408 communicate to the main processor 404 via signal paths 424 and 444, respectively. As depicted, the active memory 406 device is arranged in layers, where a base layer 411 includes a plurality of memory controllers 410 and processing resources 412. For example, the active memory device 406 includes layers 409 of memory placed on top of the base layer 411, where the layers 409 each have a plurality of memory elements. As depicted, the base layer 411 also includes an interconnect network 446 to enable high bandwidth communication between memory, memory controllers and processing resources in the device. The interconnect network 446 is an example of an interconnect 310 of FIG. 3.

In an embodiment, the active memory device 406 includes a plurality of memory vaults 414, where each memory vault 414 includes a memory element from each layer 409, the memory vaults 414 positioned adjacent to memory controllers 410 and processing resources 412. The memory vaults 414 are embodiments of the memory domains 315 of FIG. 3. Specifically, the exemplary active memory device 406 includes layers of memory elements, where the element layers form stacks, including a stack 416, where the stack 416 includes a memory vault 422 disposed above a memory controller 418 and a processing resource 420. A high bandwidth communication path 426, as another example of an interconnect 310 of FIG. 3, provides a high bandwidth, direct and substantially reduced length (e.g., as compared to paths 424, 444) communication path between the processing resource 420 and memory locations within the memory vault 422, thus reducing latency and power consumption for memory accesses. For example, the processing resource 420 may receive a command from the main processor 404, load instructions from within the active memory device 406 based on the command, and, as part of the loaded instructions, access data at a location in the memory vault 414 and perform a complex operation on the data in the processing resource 420. Further, the processing resource 420 may also store data, such as the result, in the memory vault 414 and transmit a value or signal to the main processor 404 following execution of the command. In an embodiment, the processing resource 420 stores or writes data (e.g. an operand) from a register in the processing resource 420 to the memory vault 414. The processing resource 420 can also be configured to translate addresses from virtual-to-physical and physical-to-virtual as part of the read or store operations. Thus, the processing resource 420 provides instruction loading, address translation, complex operations and other tasks local to the memory to reduce latency, save power and free up the main processor 404 to perform other tasks.

Similarly, the active memory device 408 includes a plurality of memory controllers 428 and processing resources 430 disposed on a base layer 431. In an embodiment, the active memory 408 includes layers 429 of memory devices placed on top of the base layer 431, where the layers 429 each have a plurality of memory devices. The base layer 431 also includes an interconnect network 446 to enable high bandwidth communication between memory and processing resources in the device. In an embodiment, the interconnect networks 446 of active memory device 406 and active memory device 408 are coupled and allow communication between processing resources and memory on separate devices.

In an embodiment, the active memory device 408 includes a plurality of memory vaults 432, where each memory vault 432 includes a memory element from each layer 429, the memory vaults 432 are positioned adjacent to memory controllers 428 and processing resources 430. The exemplary active memory device 408 includes multiple stacks, including stack 434, where the stack 434 includes a memory vault 436 disposed above a memory controller 440 and a processing resource 438. A high bandwidth communication path 442 provides communication between the processing resource 438 and memory locations within the memory vault 436.

Configuration information about the computer system 400 can be stored in the system configuration information 135 of FIG. 1. The main processor 404 can execute the compiler 140 of FIG. 1 for code 130 of FIG. 1 targeting the active memory devices 406 and 408. The compiler 140 of FIG. 1 can target particular memory vaults, such as memory vaults 414, 422, 432, or 436, as preferred memory domains in the preferred allocation 155 of FIG. 1. Other configurations including a single active memory device or additional active memory devices are also contemplated within the scope of the disclosure.

Figure 5:
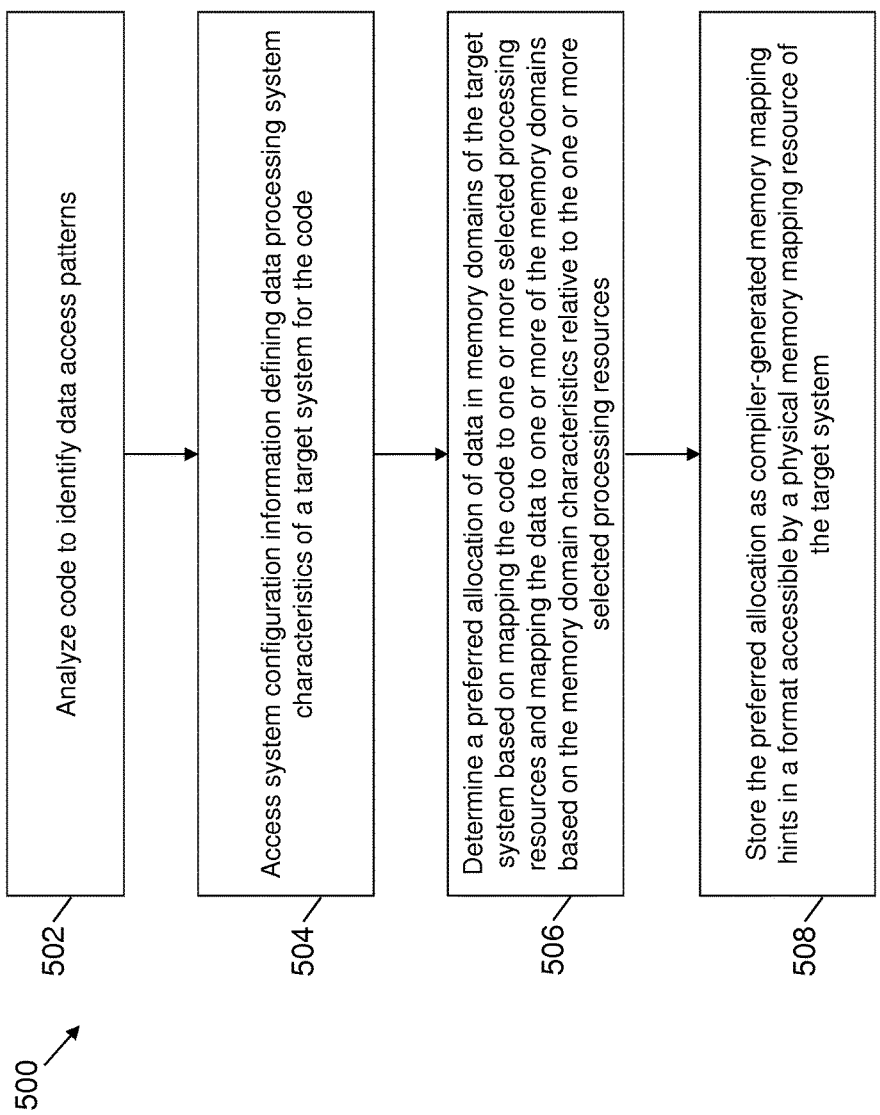
FIG. 5 illustrates a flow diagram of a method for creating compiler-generated memory mapping hints in a computer system in accordance with an embodiment.

FIG. 5 illustrates a flow diagram of a method 500 for creating compiler-generated memory mapping hints in a computer system in accordance with an embodiment. The method 500 is described in reference to FIGS. 1-5. For ease of explanation, the method 500 is described primarily with respect to the computer system 100 and target system 125 of FIG. 1 as well as elements of FIG. 3; however, the method 500 is applicable to numerous other systems such as those depicted in FIGS. 2-4.

At block 502, the compiler 140 of the computer system 100 analyzes the code 130 to identify data access patterns in the code 130. At block 504, system configuration information 135 defining data processing system characteristics of the target system 125 for the code 130 is accessed. The target system 125 may be the computer system 100. The data processing system characteristics can include a plurality of processing resources and memory domain characteristics relative to the processing resources. As previously described in reference to FIG. 3, the processing resources 305 can be organized in groups 320 having shared interconnects 310 with groups 320 of the memory domains 315. The memory domain characteristics may include one or more of: a memory domain latency, a memory domain size, and a memory domain bandwidth.

At block 506, a preferred allocation 155 of data 325 in memory domains 315 of the target system 125 is determined based on mapping the code 130 to one or more selected processing resources 305 and mapping the data 325 to one or more of the memory domains 315 based on the memory domain characteristics relative to the one or more selected processing resources 305. The preferred allocation 155 can include one or more of: mapping a portion of the data 325 in a memory domain 315 that has a lower memory domain latency relative to a processing resource 305 that accesses the portion of the data 325, spreading portions of the data 325 across specific memory domains 315 to increase utilization of the memory domain bandwidth, and grouping related data 325 into contiguous physical locations as constrained by the memory domain size.

At block 508, the preferred allocation 155 is stored as compiler-generated memory mapping hints in a format accessible by a physical memory mapping resource of the target system 125. The physical memory mapping resource of the target system 125 can be the operating system 150, which may in turn use the memory mapping translator 165 to map virtual addresses to physical addresses. The preferred allocation 155 can be stored as a preference record for the operating system 150. The preference record may include one or more virtual addresses to be mapped, one or more sizes of the data 325 to be mapped, and one or more identifiers of the one or more selected processing resources 305 and the one or more of the memory domains 315. The preference record can further include one or more of: access characteristics and a data mapping pattern. The access characteristics can be, for instance, read-only access, exclusive access, write access, and the like. The data mapping pattern can be, for example, closely packed, uniformly distributed, strided, or other known patterns. An operating system call can be inserted in the code 130 before a first use of the data 325 associated with the preference record.

Multiple sets of preference records can be created for various data structures defined and accessed by the code 130. Preference records for particular data structures need not remain fixed, as new or modified preference records can be inserted at various points in the code 130 to remap existing data more efficiently. For static data, object code can be modified to include mapping data where the processing resources 305 for execution are statically known. For dynamic data, the operating system 150 may implement mapping-aware versions of memory management routines, such as malloc( ) and free( ) routines.

Technical benefits include compiler-generated memory mapping hints in a computer system. The hints can enable optimization of virtual to physical data mapping according to needs of a specific application and can change over time as execution of the application progresses.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for creating compiler-generated memory mapping hints in a computer system, the method comprising:

analyzing code of a programing language, by a compiler of the computer system, to determine data access patterns in the code of the programming language, wherein data access patterns include access patterns for executable code generated by compiling the code of the programming language;

accessing system configuration information defining data processing system characteristics of a target system for the executable code, the data processing system characteristics comprising a plurality of processing resources and memory domain characteristics of a plurality of memory domains accessible by the processing resources;

selecting, by the compiler, two or more of the processing resources to execute the executable code as a parallel application;

inserting, by the compiler, one or more operating system calls at one or more locations within the executable code specifying one or more preferred allocations of data in the memory domains of the target system based on mapping the executable code to the two or more selected processing resources to execute as the parallel application, wherein the one or more preferred allocations are stored as preference records for an operating system, wherein preference records for the operating system comprise:

for static data, object code formatted with mapping data where a processing resource of the two or more of the processing resources for execution of the executable code is statically known;

wherein the one or more preferred allocations of data are further specified based at least in part on locations of the two or more selected processing resources proximate to physical memory locations in the memory domain, and wherein the one or more preferred allocations of data are further specified based at least in part on structures of the data in the memory domains of the target system defined and accessed by the executable code;

mapping the data to one or more of the memory domains based on the memory domain characteristics of the memory domains accessible by the two or more selected processing resources; and storing the preferred allocation as compiler-generated memory mapping hints in a format accessible by a physical memory mapping resource of the target system, wherein the physical memory mapping resource is the operating system.

2. The method of claim 1, wherein the preference record comprises: one or more virtual addresses to be mapped, one or more sizes of the data to be mapped, and one or more identifiers of the two or more selected processing resources and the one or more of the memory domains.

3. The method of claim 2, wherein the preference record further comprises one or more of: access characteristics and a data mapping pattern.

4. The method of claim 2, further comprising:
inserting an operating system call in the code before a first use of the data associated with the preference record.

5. The method of claim 1, wherein the processing resources are organized in groups having shared interconnects with groups of the memory domains, and the memory domain characteristics comprise: a memory domain latency, a memory domain size, and a memory domain bandwidth.

6. The method of claim 5, wherein the preferred allocation comprises one or more of:
mapping a portion of the data in a memory domain that has a lower memory domain latency for a processing resource that accesses the portion of the data;
spreading portions of the data across specific memory domains to increase utilization of the memory domain bandwidth; and
grouping related data into contiguous physical locations as constrained by the memory domain size.

7. The method of claim 1, wherein the target system is the computer system.

8. A system for creating compiler-generated memory mapping hints, the system comprising:
a processor; and
a memory system comprising a compiler, the compiler comprising instructions executable by the processor to perform a method comprising:
analyzing code of a programming language, by the compiler, to determine data access patterns in the code of the programming language, wherein data access patterns include access patterns for executable code generated by compiling the code of the programming language;
accessing system configuration information defining data processing system characteristics of a target system for the executable code, the data processing system characteristics comprising a plurality of processing resources and memory domain characteristics of a plurality of memory domains accessible by the processing resources;
selecting, by the compiler, two or more of the processing resources to execute the executable code as a parallel application;
inserting, by the compiler, one or more operating system calls at one or more locations within the executable code specifying one or more preferred allocations of data in the memory domains of the target system based on mapping the executable code to two or more selected processing resources to execute as the parallel application, wherein the one or more preferred allocations are stored as preference records for an operating system,
wherein preference records for the operating system comprise:
for static data, object code formatted with mapping data where a processing resource of the two or more of the processing resources for execution of the executable code is statically known;
wherein the one or more preferred allocations of data are further specified based at least in part on locations of the two or more selected processing resources proximate to physical memory locations in the memory domain, and
wherein the one or more preferred allocations of data are further specified based at least in part on structures of the data in the memory domains of the target system defined and accessed by the executable code;
mapping the data to one or more of the memory domains based on the memory domain characteristics of the memory domains accessible by the two or more selected processing resources; and
storing the preferred allocation as compiler-generated memory mapping hints in a format accessible by a physical memory mapping resource of the target system, wherein the physical memory mapping resource is the operating system.

9. The system of claim 8, wherein the preference record comprises: one or more virtual addresses to be mapped, one or more sizes of the data to be mapped, and one or more identifiers of the two or more selected processing resources and the one or more of the memory domains.

10. The system of claim 9, wherein the preference record further comprises one or more of: access characteristics and a data mapping pattern.

11. The system of claim 9, wherein the compiler further comprises instructions executable by the processor to insert an operating system call in the code before a first use of the data associated with the preference record.

12. The system of claim 8, wherein the processing resources are organized in groups having shared interconnects with groups of the memory domains, and the memory domain characteristics comprise: a memory domain latency, a memory domain size, and a memory domain bandwidth.

13. The system of claim 12, wherein the preferred allocation comprises one or more of:
mapping a portion of the data in a memory domain that has a lower memory domain latency for a processing resource that accesses the portion of the data;
spreading portions of the data across specific memory domains to increase utilization of the memory domain bandwidth; and
grouping related data into contiguous physical locations as constrained by the memory domain size.

14. A computer program product for creating compiler-generated memory mapping hints in a computer system, the computer program product comprising a computer readable storage medium having program instructions embodied therewith, the program instructions executable by a processor of the computer system to cause the processor to perform a method comprising:

analyzing code of a programing language, by a compiler of the computer system, to determine data access patterns in the code of a programing language, wherein data access patterns include access patterns for executable code generated by compiling the code of the programming language;

accessing system configuration information defining data processing system characteristics of a target system for the executable code, the data processing system characteristics comprising a plurality of processing resources and memory domain characteristics of a plurality of memory domains accessible by the processing resources;

selecting, by the compiler, two or more of the processing resources to execute of the executable code as a parallel application;

inserting, by the compiler, one or more operating system calls at one or more locations within the executable code specifying one or more preferred allocations of data in the memory domains of the target system based on mapping the executable code to two or more selected processing resources to execute as the parallel application, wherein the one or more preferred allocations are stored as preference records for an operating system, wherein preference records for the operating system comprise:

for static data, object code formatted with mapping data where a processing resource of the two or more of the processing resources for execution of the executable code is statically known;

wherein the one or more preferred allocations of data are further specified based at least in part on locations of the two or more selected processing resources proximate to physical memory locations in the memory domain, and wherein the one or more preferred allocations of data are further specified based at least in part on structures of the data in the memory domains of the target system defined and accessed by the executable code;

mapping the data to one or more of the memory domains based on the memory domain characteristics of the memory domains accessible by the two or more selected processing resources; and storing the preferred allocation as compiler-generated memory mapping hints in a format accessible by a physical memory mapping resource of the target system, wherein the physical memory mapping resource is the operating system.

15. The computer program product of claim 14, wherein the preference record comprises: one or more virtual addresses to be mapped, one or more sizes of the data to be mapped, and one or more identifiers of the two or more selected processing resources and the one or more of the memory domains.

16. The computer program product of claim 15, wherein the preference record further comprises one or more of: access characteristics and a data mapping pattern.

17. The computer program product of claim 15, further comprising:

inserting an operating system call in the code before a first use of the data associated with the preference record.

18. The computer program product of claim 14, wherein the processing resources are organized in groups having shared interconnects with groups of the memory domains, and the memory domain characteristics comprise: a memory domain latency, a memory domain size, and a memory domain bandwidth.

19. The computer program product of claim 18, wherein the preferred allocation comprises one or more of:

mapping a portion of the data in a memory domain that has a lower memory domain latency for a processing resource that accesses the portion of the data;

spreading portions of the data across specific memory domains to increase utilization of the memory domain bandwidth; and grouping related data into contiguous physical locations as constrained by the memory domain size.

20. The computer program product of claim 14, wherein the target system is the computer system.

* * * * *